United States Patent [19]

Nassiri

[11] Patent Number: 4,512,613
[45] Date of Patent: Apr. 23, 1985

[54] WHEEL HUB LATCH MECHANISM FOR POWER WHEELCHAIRS

[75] Inventor: Joe-Massoud Nassiri, Thousand Oaks, Calif.

[73] Assignee: Everest & Jennings, Inc., Camarillo, Calif.

[21] Appl. No.: 446,337

[22] Filed: Dec. 2, 1982

[51] Int. Cl.³ ............................................. B60B 27/00
[52] U.S. Cl. ...................................... 301/1; 180/907; 301/6 R; 403/1
[58] Field of Search .......................... 180/6.5, DIG. 3; 280/242 WC, 289 WC; 297/DIG. 4; 301/121, 122, 112, 6 R, 6 WB; 192/67 P; 403/1

[56] References Cited

U.S. PATENT DOCUMENTS

| | | | |
|---|---|---|---|
| 589,338 | 8/1897 | Copeland et al. | 192/67 P |
| 3,251,630 | 5/1966 | Astley | 192/67 P |
| 3,889,773 | 6/1975 | Chant | 180/DIG. 3 |

FOREIGN PATENT DOCUMENTS 46-14006  4/1971  Japan ........................................ 403/1

*Primary Examiner*—John A. Pekar
*Attorney, Agent, or Firm*—Ralph B. Pastoriza

[57] ABSTRACT

The free-wheeling latch disengages the wheels of power type wheelchairs from the motors to permit easy manual use of the wheelchair. The latch itself is in the form of a manually movable pin projecting into a bore in the side of the hub. When the pin is moved inwardly, it engages a flange structure secured to the wheel axle and thereby locks the wheel to the axle for operation by the wheelchair motor. When the pin is manually retracted, the wheel and hub are free to rotate independently of the drive system to the axle.

4 Claims, 3 Drawing Figures

WHEEL HUB LATCH MECHANISM FOR POWER WHEELCHAIRS

FIELD OF THE INVENTION

This invention relates generally to wheelchairs and more particularly to a wheel hub latch mechanism for power type wheelchairs for freeing the wheels from the drive mechanism so that a patient in the chair can be moved around easily in those situations where power is not used.

BACKGROUND OF THE INVENTION

Power wheelchairs generally include storage batteries with electric motors for driving the rear axle of the wheelchair which in turn is connected to the rear wheel hub. A common axis may be provided for these rear wheels or each rear wheel may be independently driven by appropriate motor means.

In many situations, it is often desirable to move the wheelchair with a patient in the chair only a short distance or maneuver it into a more convenient position for a particular activity. In some instances, the patient may be asleep in the chair and there is normally no need to use the power mechanism. In fact, under such conditions where the patient is not conscious, it would be awkward for a nurse or doctor to try to operate the power portion of the chair.

Because the motor is connected to the rear wheels to drive the same, any movement of the wheelchair without the benefit of the motors is difficult because of the drag resulting from the drive connection to the wheels.

BRIEF DESCRIPTION OF THE PRESENT INVENTION

With the foregoing in mind, the present invention contemplates a unique wheel hub latch mechanism for power type wheelchairs wherein the mobility of the power chair is vastly improved when electric power is not being used.

More particularly, in accord with the present invention, there is provided a wheel hub latch mechanism comprised of a specially designed wheel hub. Bearing means are provided secured to the axle and so designed as to mount the newly designed wheel hub for free rotation about the bearing means so as to be independent of the power drive system for the rear axle of the wheel. A manually operable latch means, in turn, is provided for locking the wheel hub to the bearing means for rotation with the bearing means whenever it is desired to operate the wheelchair by the power driven rear axle. When it is desired to permit rotation of the rear wheels independently of the drive mechanism; that is, provide for "free wheeling", it is only necessary to manually manipulate the latch means to unlock the wheel hub from the bearing means.

The latch means and other components are so designed that no special tools are required and the engagement and disengagement of the wheel with the power transmission can easily be carried out by a nurse or other attendant.

BRIEF DESCRIPTION OF THE DRAWINGS

A better understanding of this invention will be had by referring to the accompanying drawings in which.

DETAILED DESCRIPTION OF THE PREFERRED EMBODIMENT

Figure 1:
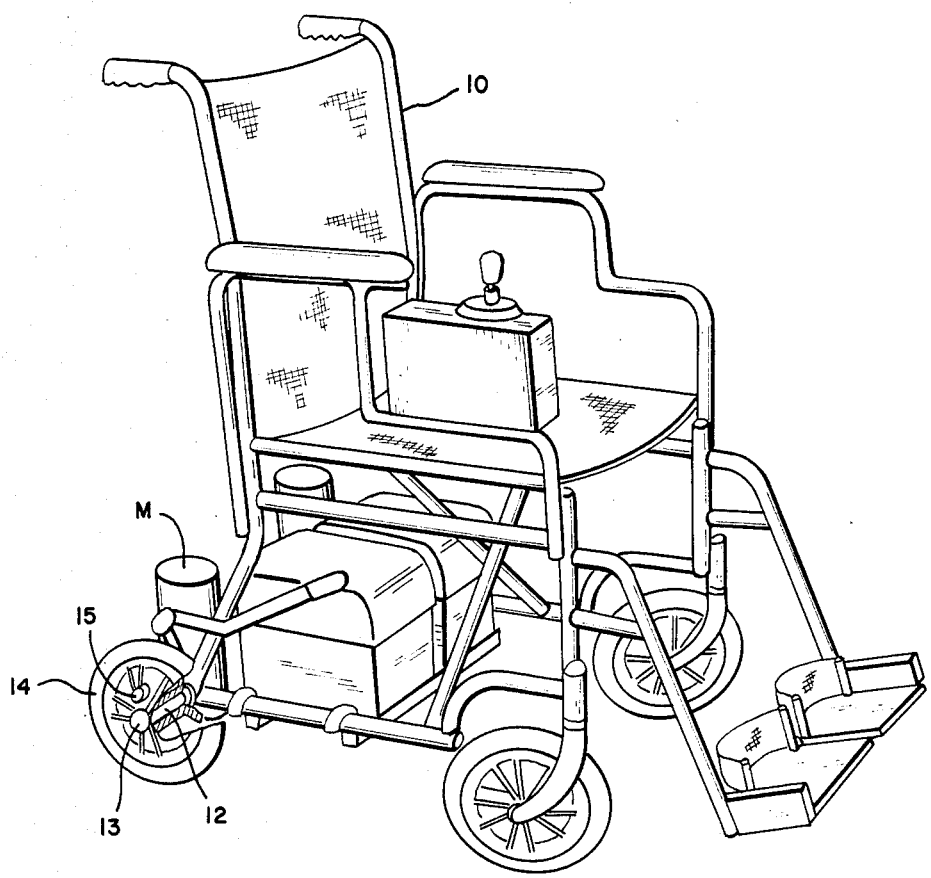
FIG. 1 is a perspective view of a typical power wheelchair incorporating the wheel hub latch mechanism of this invention.

Referring first to FIG. 1, there is shown a typical power wheelchair 10 incorporating suitable storage batteries and a drive motor all schematically indicated by the block 11 carried on the wheelchair 10 under the seat. Motors for each of the wheels will transmit torque to the wheels through a rear axle such as indicated at 12 by way of the wheel hub.

Because of the foregoing described connection, it is difficult for an attendant to roll around the wheelchair when the electrical power is not to be used because of the drive connection between the motor and the wheels. As mentioned heretofore, in accord with the present invention, this problem is overcome by providing a latch mechanism which will, in effect, disengage the rear wheel from the drive mechanism so that it is free wheeling.

This hub latch mechanism takes the form of a modified designed hub shown at 13 in FIG. 1 supporting a wheel 14 and arranged to be disengaged from the axle 12 by a latch means. A part of this latch means in the form of a pin head 15 is shown in FIG. 1 on the exterior or outside portion of the hub 13 and is arranged to be pulled outwardly in the direction of the arrow to effect the desired disengagement, all as will become clearer as the description proceeds.

Figure 2:
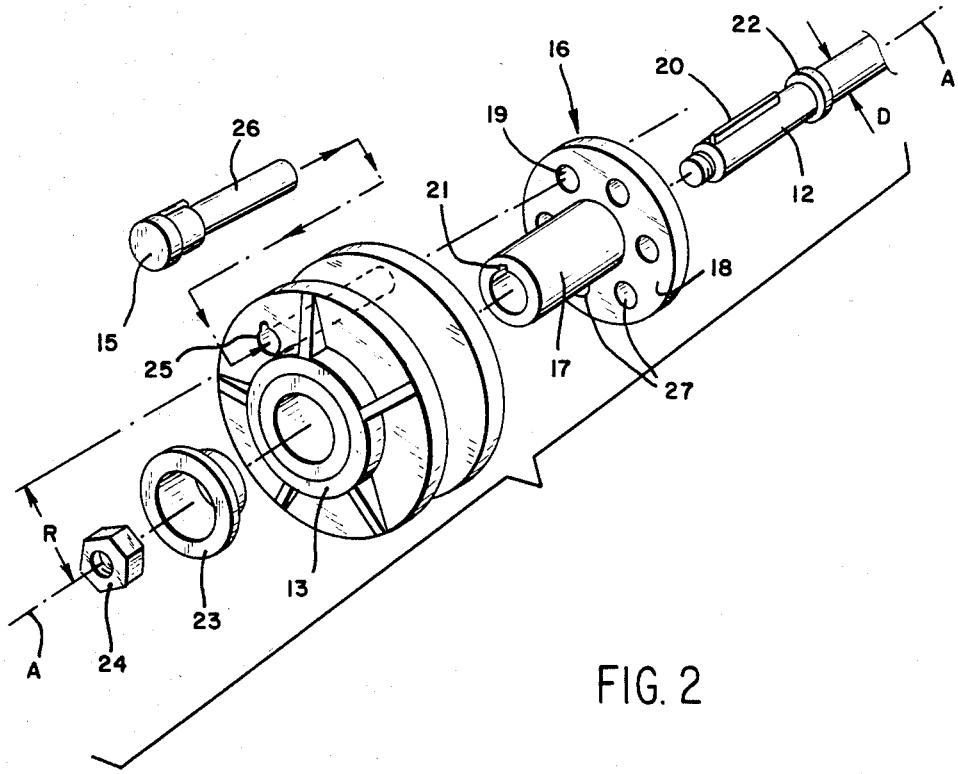
FIG. 2 is an enlarged exploded perspective view of the basic components making up the wheel hub latch of FIG. 1; and, FIG. 3 is a greatly enlarged cross section of the various components of FIG. 2 in assembled relationship wherein certain ones of the components are shown in full lines.

Referring now to FIG. 2, the hub latch mechanism includes, in addition to the modified hub 13, a bearing member 16 comprised of a tubular portion 17 for surrounding an end portion of the axle 12 normally secured to a conventional wheel hub. In addition, the bearing member 16 includes an integrally formed flange portion 18 extending radially outwardly from the inner end of the tubular portion 17. This flange includes adjacent to its outer periphery at least one hole 19 passing therethrough in a direction parallel to the axis of the tubular portion 17 and at a given radial distance therefrom. This axis is indicated at A—A and corresponds to the axis of the axle 12 when the components are assembled. The given radial distance is indicated by the letter R in FIG. 2.

Appropriate means in the form of a key 20 and corresponding groove 21 in the axle 12 and inside of the tubular portion 17 of the bearing member are provided for locking the bearing member to the axle for power rotation therewith.

The hub 13 itself is journalled on the outer surface of the tubular portion 17 of the bearing member 16, this tubular portion comprising a special plastic material which provides a journal bearing for the hub permitting free rotation of the hub 13 on the tubular portion 17 even though the tubular portion and flange are locked to the axle 12.

The hub 13 and bearing member 16 are axially held captive on the axle 12 by retaining ring 22 and front retainer cup 23. Nut 24 threads to the end of the axle 12 to secure the retainer cup 23 in place.

The actual latching of the hub 13 to the bearing member 16 so as to be power driven by rotation of the axle 12 is accomplished by providing a bore 25 in the hub 13 running parallel to the axis A—A and at the same radial distance R from this axis as is the hole 19 in the bearing member flange 18. A pin shank 26 extending from the latch head 15 described in conjunction with FIG. 1 is receivable in the bore 25 and in the hole 19 when in its maximum inward position to thereby lock the hub 13 to the flange 18.

In the particular embodiment illustrated in FIG. 2, the flange 18 includes a series of additional holes 27 at the same radial distance R from the axis A—A as the hole 19 and equally circumferentially spaced successively relative to the hole 19. By providing additional holes 27, the pin shank 26 can be received in any one of the holes to effect an immediate locking of the hub 13 to the flange. Thus, as the hub rotates relative to the flange, the bore 25 will come into successive registration with the various holes 27 and the pin shank as stated can be received in any one of these holes.

Figure 3:
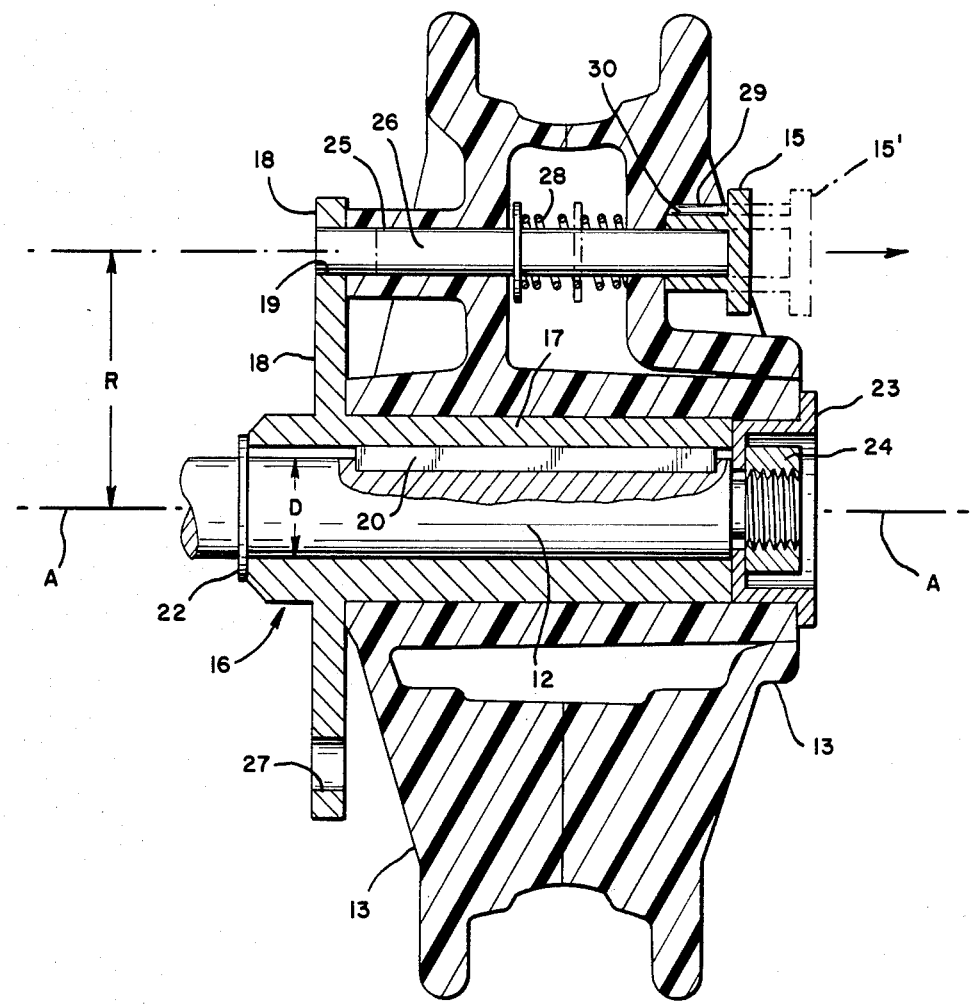

All of the foregoing will become clearer by now referring to the assembled view of FIG. 3. In FIG. 3, the same numerals used in FIGS. 1 and 2 designate the corresponding parts.

As shown the nut 24 is secured to the end of the axle 12 to retain the cup 23 in place so that the bearing element 16 and thus the hub 13 is held captive axially to the axle 12.

The pin shank 26, in turn, is illustrated in FIG. 3 in its maximum inward position wherein its end is received within the hole 19 shown in registration with the bore 25. In this solid line position of the pin shank 26 and head 15, the hub 13 is locked for rotation with the bearing element 16 and thus with the axle 12 because of the keying of the bearing element to the axle.

When the latch means in the form of the pin shank 26 and head 15 is retracted to the right to the dotted line position 15' the end of the pin shank 26 is free of the hole 19 but still within the bore 25. As a consequence, the hub is now free to rotate about the tubular portion 17, the exterior of this portion constituting a journalling or bearing surface for the hub.

In order that the latch is held in one position or the other, there is preferably provided a spring indicated at 28 in FIG. 3 biasing the pin shank 26 towards the flange 18. Whenever one of the holes in the flange 18 is in registration with the bore 25, the pin shank 26 will thus automatically pass into the hole and lock the hub to the flange.

In order to hold the pin in its retracted position to provide for free wheeling, the entrance opening to the bore 25 on the outer side of the hub 13 may be assymmetric as by providing a small slot 29. The head 15 itself also includes an assymmetric portion such as a small rib 30 arranged to register with the assymmetric portion 29 in the entrance opening when the pin head is in a first rotated position.

With the foregoing arrangement, retraction of the head free of the entrance opening and rotation thereof will then position the rib 30 out of registration with the slot 29 and thus the head will be held in the dotted line position indicated at 15' in FIG. 3 to thereby hold the pin shank 26 free of the hole 19 in the flange 18.

The foregoing operation can be easily carried out manually by a nurse or attendant whenever it is desired to free the wheel on the hub 13 from the power drive mechanism connected to the axle 12.

As already described, by providing the spring 28, once the head 15 of the latch is rotated so as to bring the rib 30 into registration with the slot 29 in the entrance opening of the bore so that the pin can move to the left as illustrated in FIG. 3, the shank will automatically pop into the next hole coming into registration with the bore 19 as the flange is power rotated relative to the wheel. Popping in of the pin shank is assured by the provision of the spring 28. Once the pin is received in one of the holes in the flange, the desired locking is effected and the wheel is thus in engagement for driving by the motor on the wheelchair.

The foregoing hub latch arrangement has advantages in that by making the given radial distance R of the hole and bore from the axis of the tubular portion 17; that is, the axis A—A of the axle 12, greater than twice the diameter D of the axle, an increased driving torque is provided for the hub over that provided by a direct connection of the axle to the hub thereby lessening strain on the latch hub mechanism when transferring power from the axle to the hub. By reducing such strain, the life of the latch mechanism is substantially increased.

It will be understood that if the opposite wheel for the power wheelchair shown in FIG. 1 is driven by a motor, a similar modified hub structure with a latch means can be provided identical to that described herein so that both power driven wheels can be disengaged.

From all of the foregoing, it will now be evident that the present invention has provided a valuable and unique wheel hub latch mechanism for power driven wheelchairs which permits the power wheels to be essentially disengaged from the drive structure for easy free wheeling whereby an attendant can very easily maneuver the wheelchair without electric power should such be desired. Further, it will be evident from the foregoing description that the latch itself can be easily manually manipulated without requiring any special tools.

Various changes falling within the scope and spirit of this invention will occur to those skilled in the art. The wheel hub latch mechanism is therefore not to be thought of as limited to the specific embodiment set forth merely for illustrative purposes.

What is claimed is:

1. A wheel hub latch mechanism for a power wheelchair having a power driven rear axle normally secured to the wheel hubs of the rear wheels of the wheelchair, said latch hub mechanism including, in combination:
    (a) a bearing member comprised of a tubular portion surrounding a portion of said axle normally secured to a wheel hub and an integrally formed flange portion extending outwardly from the inner end of the tubular portion, the portion of said flange adjacent to its outer periphery having at least one hole passing therethrough in a direction parallel to the axis of the tubular portion and at a given radial distance therefrom;
    (b) means for locking said bearing member to said portion of said axle for power rotation therewith;
    (c) a wheel hub for carrying a rear wheel for said wheelchair journalled for free rotation on the exterior surface of said tubular portion of said bearing member, an inner side portion of said hub being juxtaposed to said flange portion and having a bore at the same given radial distance from the axis of said tubular portion as is said hole in said flange such that said bore can be positioned in registration with said hole by rotating said hub freely on said tubular portion of said bearing member; and (d) pin means carried by said hub including a pin shank receivable in said bore and said hole when in registration with said bore for locking said hub to said flange so that said hub and wheel are driven by said flange when said rear axle is power driven, removal of said pin from said hole releasing said hub from said flange so that said hub and wheel supported thereby are independent of the power drive system and thereby essentially free-wheeling, said given radial distance of said hole and bore from the axis of said tubular portion being greater than twice the diameter of said axle such that an increased driving torque is provided for said hub when said hub is locked to said flange, over that provided by direct connection of the axle portion to a wheel hub, thereby lessening strain on the hub latch mechanism.

2. A wheel hub latch mechanism according to claim 1, in which said flange portion includes a series of holes all radially spaced from the axis of said tubular portion by said given radial distance and equally circumferentially spaced with said first mentioned hole about said flange portion whereby said pin shank can be received in any one of said holes, the same coming into successive registrations with said bore when said hub is rotated relative to said bearing member.

3. A wheel hub latch mechanism according to claim 1, in which said pin shank extends into said bore from the outer side of said hub; a spring in said hub biasing said shank into said bore; a head on said shank larger than said bore to limit inward movement of said shank by said spring to a maximum inward position in which the shank passes through both said bore and said hole when in registration therewith: and means for holding said shank in a retracted position in said bore but free of said hole.

4. A wheel hub latch mechanism according to claim 3, in which the outer entrance opening of said bore in said hub receiving said pin shank includes an assymmetrical portion, said means for holding said shank in a retracted position including a similar assymmetrical portion on the head registering with said first mentioned assymmetrical portion when the shank is in said maximum inward position, retraction of the shank and rotation of the head to position said assymmetrical portion on the head out of registration with the assymmetrical portion on the entrance opening preventing inward movement of the head and shank so that the head and shank are held in said retracted position.

* * * * *